United States Patent
Bonser et al.

(10) Patent No.: US 7,628,893 B1
(45) Date of Patent: Dec. 8, 2009

(54) APPARATUS AND METHOD FOR SEPARATION

(75) Inventors: David William Bonser, Saylorsburg, PA (US); Irl E. Ward, Bethlehem, PA (US); Alan R. Duly, Douglassville, PA (US)

(73) Assignees: Pure Energy Technology Co, Saylorsburg, PA (US); PPT Research Inc., Allentown, PA (US)

( * ) Notice: Subject to any disclaimer, the term of this patent is extended or adjusted under 35 U.S.C. 154(b) by 689 days.

(21) Appl. No.: 11/194,305

(22) Filed: Aug. 1, 2005

(51) Int. Cl.
*B01D 1/16* (2006.01)
*B01D 3/06* (2006.01)
*B01D 3/10* (2006.01)
*B01D 3/42* (2006.01)

(52) U.S. Cl. .................. 203/2; 159/2.1; 159/43.1; 159/44; 159/48.2; 159/DIG. 16; 202/160; 202/176; 202/186; 202/197; 202/236; 203/25; 203/87; 203/88; 203/90; 203/91; 239/1; 239/433

(58) Field of Classification Search .............. 159/2.1, 159/2.3, 3, 43.1, 44, 48.1, 48.2, DIG. 6, DIG. 16, 159/DIG. 22, DIG. 32; 202/160, 176, 186, 202/189, 191, 197, 236; 203/1, 2, 25, 87, 203/88, 90, 91, DIG. 8; 239/1, 433, 703, 239/704
See application file for complete search history.

(56) References Cited

U.S. PATENT DOCUMENTS

| | | | | |
|---|---|---|---|---|
| 3,450,183 A | * | 6/1969 | Hinton | 159/2.1 |
| 4,504,355 A | * | 3/1985 | Yamazaki et al. | 159/3 |
| 5,102,503 A | * | 4/1992 | Silinski et al. | 202/83 |
| 5,532,389 A | * | 7/1996 | Trent et al. | 549/522 |
| 6,419,210 B1 | * | 7/2002 | Low | 261/62 |
| 6,820,865 B2 | * | 11/2004 | Low | 261/117 |
| 6,932,889 B1 | * | 8/2005 | Holcomb | 203/11 |
| 2002/0190404 A1 | * | 12/2002 | Baarda | 261/115 |
| 2008/0027242 A1 | * | 1/2008 | Knosche et al. | 560/347 |

* cited by examiner

Primary Examiner—Virginia Manoharan
(74) Attorney, Agent, or Firm—John Lezdey & Assoc

(57) ABSTRACT

A method and an apparatus is provided for the separation of liquid-liquid and liquid-solids compositions by flash evaporation in a heated vacuum chamber. The compositions are injected through an atomizing spray nozzle having a spray cone downward of about 30 to 150 degrees. The compositions are preheated and injected under pressure into the preheated vacuum evaporation chamber. The vaporized liquid that is formed is collected in a condenser which draws the vapors by vacuum or pressure differential. Any solids are collected at the bottom of the vacuum chamber as semi-dry or dry solids.

16 Claims, 2 Drawing Sheets

APPARATUS AND METHOD FOR SEPARATION

FIELD OF THE INVENTION

There is provided a method and apparatus for the separation of liquid-liquid compositions or liquid-solid compositions by flash evaporation using a common method and apparatus for both separations. More particularly, there is a separation and collection of at least one liquid and solids that are either in a solution or in a suspension that are delivered under pressure to a vacuum chamber at elevated temperatures.

BACKGROUND OF THE INVENTION

Spray dryers have been used primarily for the recovery of fine powders from liquid compositions by spraying feed liquid into a heated atmospheric pressure, hot air drying chamber whereby the liquid is evaporated using hot air turbulence and the solid component is made into a powder of typically uncontrolled particle sizes. The prior art methods have the disadvantage of having particles being deposited on the inner walls of the drying chamber. The deposits prevent a switch over to other products without washing the deposits from the walls and drying the chamber which is required in a switch-over where higher purity of collected product is required.

U.S. Pat. No. 5,015,332 to Iwaya et al discloses a spray drying chamber for the separation of solids from a liquid using an ultrasonic spraying mechanism to form micro-droplets wherein the inner chamber is heated by hot air and by microwave at atmospheric pressure.

SUMMARY OF THE INVENTION

The present invention provides a method and an apparatus for the separation of components in liquids and liquid-solid compositions.

The apparatus of the invention comprises an evacuated evaporator vessel having an inner chamber with a vertical axis and a particle collecting portion at the bottom;

feeding means for delivering feed compositions which are either liquid-liquid or liquid-solids compositions under elevated temperature and pressure to an atomizing feed nozzle;

at least one atomizing feed nozzle disposed within and at the top of the evaporator vessel, said nozzle providing a downward spray cone angle of about 30 to 150 degrees;

means for providing radiant heat collectively concentric with the inner circumferential surface of the evaporator vessel and directed radially inwardly into the free space of said evaporator vessel;

at least one condenser or vapor condensing heat exchanger, operating connectively with the upper portion of said evaporator vessel;

vacuum means operating connectively with said at least one condenser for maintaining a vacuum in said at least one condenser and said evaporator vessel, and at least one liquid collecting means connected to said at least one condenser.

Advantageously, the bottom portion of the chamber has a conical shape and a liquid particle demister or particle collector is provided prior to vapor condensing.

According to the method of the invention, a heated feed material which is a liquid-liquid or liquid-solid composition is sprayed under pressure into an evacuated heated chamber at a spray cone angle from about 30 to 150 degrees. The chamber has a partial pressure of from about 0.1 mm Hg absolute to 760 mm Hg absolute and a temperature range from about 10° C. to 450° C. The solid particles in the solids-liquid fluid fall out downwardly and the liquid goes through a flash phase change to a gas phase within the free space of said heated evacuated chamber, which is removed from the chamber to a condenser which condenses the gas back into a fluid.

Advantageously, when multiple liquids are involved there may be multiple condensers which have different condensing temperatures. It is preferable to remove solid or liquid particles before condensation.

It is a general object of the invention to provide a method and an apparatus which can be used to separate liquids from liquid-liquid compositions and liquid-solids compositions.

It is another object of the invention to provide an apparatus which can perform both liquid-liquid and liquid-solid separations.

The objects and advantages of the present invention will be better understood from a reading of the Preferred Embodiments of the Present Invention and the drawings.

DESCRIPTION OF THE PREFERRED EMBODIMENTS

Figure 1:
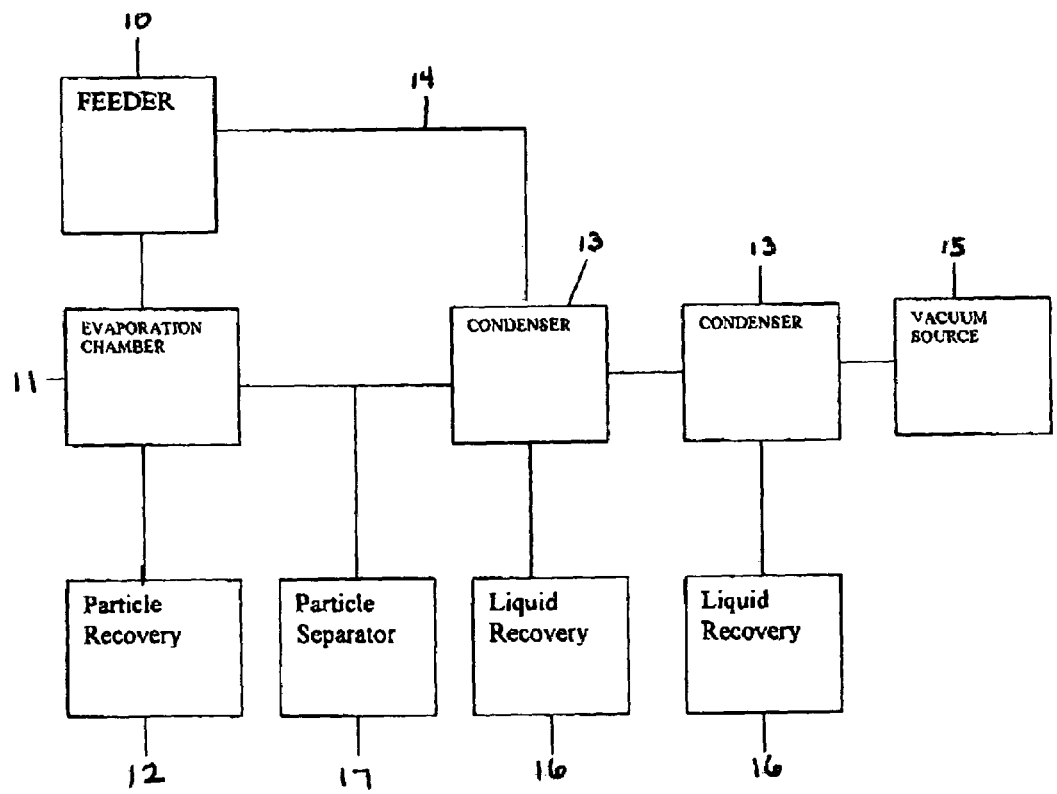
FIG. 1 is a schematic of the method of the present invention.

According to the present invention there is provided a method and an apparatus for the separation of liquid-liquid solutions or liquid-solid suspensions, slurries or solutions by flash evaporation using a common method and apparatus. More particularly, the method provides for the separation and collection of liquids from a composition comprising a mixture of liquids or a composition composed of at least one liquid and solids either in a solution or in a suspension in a vacuum chamber typically at elevated temperatures.

According to one embodiment of the invention, a liquid-liquid composition or a liquid-solids composition is sprayed under elevated pressure and heat at a downward cone angle into a heated chamber under a vacuum or optionally in an inert atmosphere with nitrogen, argon or the like so as to flash evaporate off the liquid. The liquid is flash evaporated within the free space of the heated chamber and without the need to contact any hot surface. The vaporized gas is condensed in at least one condenser mechanism and any solids are collected at the bottom of the chamber via gravity and downward mechanical force. In the case of a mixture of liquids, the different liquids can be collected in different condensers based on their different boiling points and condensation temperatures. Also, one liquid may be condensed and collected while others remain in the vapor state, depending upon operation parameters selected.

Alternatively, the heat collected during the condensation of vapor of a separated liquid can be recycled back to the feed material to preheat the composition that is sprayed into the chamber, thereby greatly increasing thermal and operational efficiency.

According to another embodiment of the invention there is provided an apparatus which preferably comprises a cylindrical chamber with a dish or coned bottom having means for heating said chamber, means for spraying a fluid or suspension under pressure into said chamber, means for creating a vacuum in said chamber, means for removing evaporated liquid vapors from said chamber, and means for collecting solids from said chamber.

More particularly, there is provided an angularly and downwardly disposed atomizing spraying nozzle about the top part of the chamber for spraying a fluid composition under elevated pressure at a given angle with a spray pattern of about 30 to 150 degrees from the top part of the chamber. The interior walls of the chamber can be heated and/or heating means can be placed within the chamber to produce the required heat to the interior so as to produce a flash evaporation of the liquid within the free space of the chamber, and without the requirement for the sprayed liquid to contact a hot surface.

At least one condenser can be associated with a vacuum source to draw the vapors into the condenser or condensers. Alternatively, the condenser can be used to recover the heat absorbed from the condensing vapors and recycle said recovered heat in order to preheat the initial composition sprayed into the chamber.

It is advantageous in some separations to use a particle separator or demister prior to condensing the liquid to capture any solid or liquid particles which may have been drawn by the vacuum before vaporization.

As seen in FIG. 1, the method of the invention broadly provides introducing heated feeding material in a feeder (10), which material is either a liquid-liquid composition, solution, suspension or slurry that is sprayed into an evaporation chamber (11) having a reduced pressure of about 0.1 mm Hg absolute to 760 mm Hg absolute through a nozzle under pressure to form a spray cone angle from about 30 to 150 degrees downward into the chamber (11). Within milliseconds to about one second after emerging from the nozzle head, the liquid flash evaporates within the free space of the chamber (11) and any particles accelerate toward the bottom of the chamber (11) with kinetic energy supplied to it from the nozzle pressure. The flashed liquid now in gaseous form follows the path upward to the top part of the chamber (11) in the direction of the vacuum being pulled by vacuum source (15). The solid particles fall to the chamber bottom and then into the particle recovery (12).

The gaseous liquid is drawn into at least one condenser (13) where absorbed heat is recycled to the feeder (10) by line (14) while the condensed liquid goes into the liquid recovery (16). The temperature in the more than one condenser is set according to the different boiling points of the liquid either under vacuum or normal atmospheric conditions when liquid-liquid separation is required. Typically, boiling points in liquid-liquid separation should differ by at least 20 degrees for effective separation to occur. It is possible to separate liquids of more similar boiling points but more passes through the system may be required to obtain full separation. However, in some cases the boiling points of the combined liquids at atmospheric pressure may be similar, but their respective boiling points under vacuum may be quite different. For example, in a solution of PEG-200 and 2-aminoethanol, at atmospheric pressure the boiling point of PEG-200 is 199° C. and that of 2-aminoethanol is 172° C.; a difference of about 27 degrees C. However, under 10 mm Hg of vacuum the boiling point of PEG-200 is about 170° C. while that of 2-aminoethanol is about 60-70° C. Therefore, the difference of boiling points under vacuum is about 100° C.

Alternatively, in some cases the method of the invention can proceed under atmospheric pressure, for example, when the liquid involved has a low temperature volatility, particularly when a single solvent comprises the composition.

Depending upon the composition to be separated, the gaseous stream from the evaporation chamber (11) prior to condensation may pass through a demister and/or particle separator (17) in order to remove any solids or liquid particles which may have been drawn by the suction of the vacuum before forming a gaseous state.

In the operation of the process, the temperature throughout the chamber (11) should remain within the set points at all times and the temperature difference or distribution should remain close to zero during operation. Therefore, not only the walls of the chamber (11) should be heated but also a supplemental heat source within the free space of the chamber (11) should be positioned outside of the spray pattern of the nozzle. It is most preferable to locate the supplemental heat source above the nozzle head and spray path. The supplemental heat source provides direct heating of the spray nozzle and free space in the chamber to provide a recurring extra source of heat to a pressurized slurry liquid that will help ensure fast evaporation. The supplemental heat source is preferably radiant heat from infra red (I.R.) filaments, coils and the like.

Accordingly, the liquid composition into the nozzle head has been "super heated" to a temperature near, at or beyond its vacuum boiling point so that much of the latent heat of evaporation is supplied to the liquid before it enters the vacuum chamber (11). The chamber is dual heated by radiant heat from the internal walls of the chamber (11) and from the supplemental heat source, but not in the liquid spray stream from the nozzle.

Consequently, the location of the nozzle within the chamber, nozzle pressure and velocity of micro-droplets from the nozzle head, the angle of spray, and location of the supplemental heat source all contribute to ensuring that flashed liquid into hot gas travels upward within the chamber (11) to the vacuum source, and dry particles travel downward to the chamber bottom.

Figure 2:
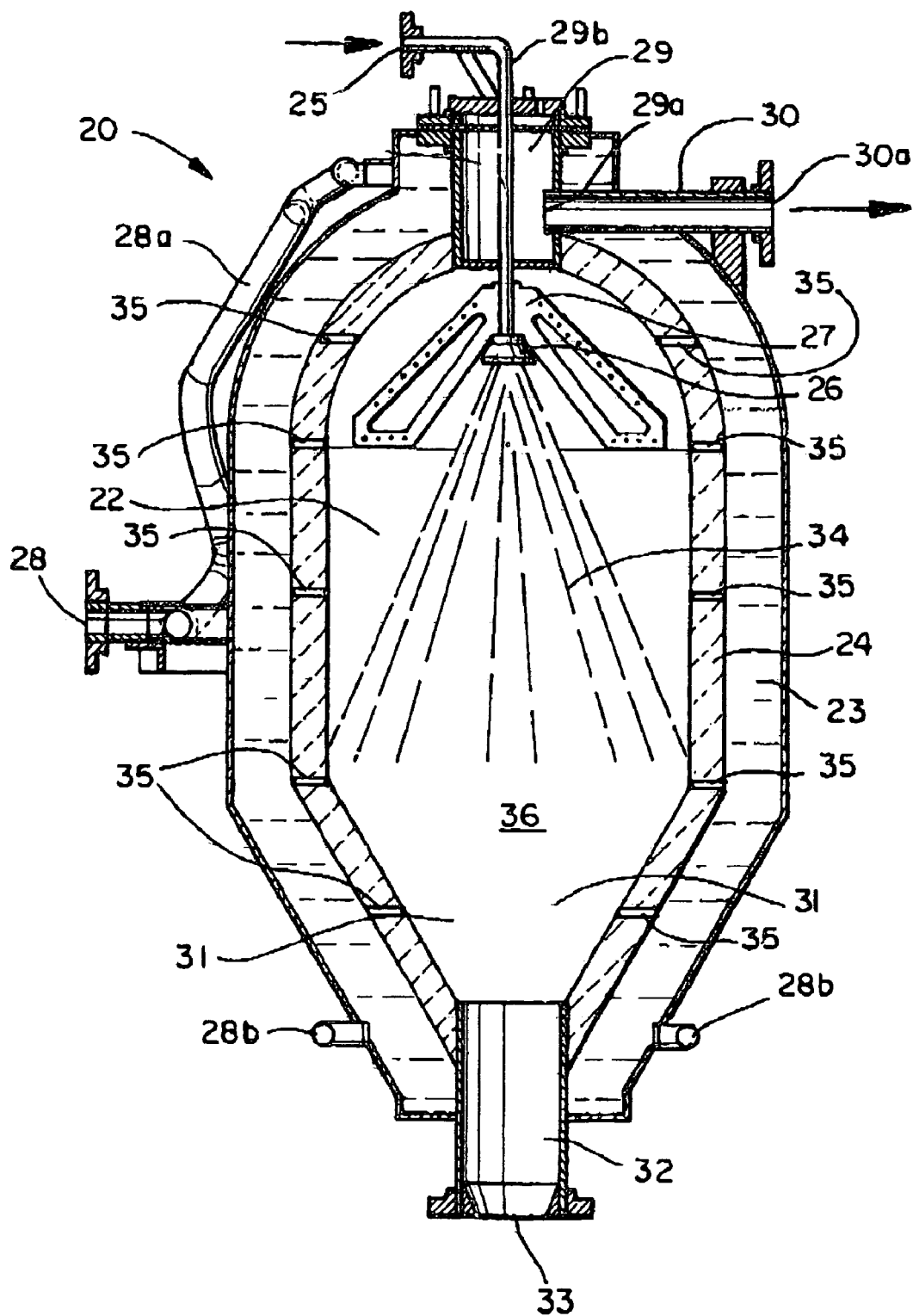
FIG. 2 is a cross-sectional view of the evaporation apparatus of the present invention.

With reference to FIG. 2, there is illustrated an evaporation apparatus (20) of the present invention. The apparatus (20) comprises an insulated housing with an inner chamber (22). The inner chamber (22) has a wall (24) through which thermocouples (35) are placed throughout the inner chamber to sense and help maintain a constant temperature in the top, bottom, and middle sections of the chamber (22). Surrounding the wall (24) is an oil jacket (23) in which heated oil circulates to heat the evacuated chamber (22) by radiant heat during operation. Heated oil enters through inlet-outlet (28) and flows through line (28*a*) to the top of the oil jacket (23) and circulates around to inlet-outlet (28) where it passes through a preheater before returning into circulation.

Alternative to the oil heating system there may be used other heat sources such as microwave, electrical heat, heating coils containing steam or other liquids, infra red irradiation, gas and the like.

The inner wall (24) is preferably coated to provide a smooth surface to eliminate any cracks or surface voids which may trap solid particles.

At the top of the apparatus (20) is feed nozzle pipe or conduit (29*b*) which passes through a cylindrical cap (29) into the chamber (22) having an atomizing spray head (26) which provides a spray cone angle from about 30 to 150 degrees downward. The nozzle pipe (29*b*) has an inlet (25) through which heated fluid under a pressure from 10 psi to 1000 psi, depending upon the liquid being fed therein.

The cap (29) has port (29*a*) associated with a gas outlet line (30) which flows gas through outlet (30*a*) to a condenser system (not shown) which is associated with a vacuum source (not shown). Optionally, before entering the condenser system there is a liquid particle demister or solid particle eliminator (not shown). The condenser system can comprise one or more condensers depending upon the feed compositions which may comprise one or more different liquids. Preferably the condensers are heat exchangers which have coils capable of transferring heat from the condensing gas to heat the feed material.

Behind the nozzle head (26) and away from the spray area (34) is provided a supplemental heater (27).

At the bottom of the apparatus (20) is a section (31) having a conical shape which is heated by part (28b) of the oil line. Alternatively, supplemental or substitute heating source such as external I.R. coils or filaments may supply the needed heat. As shown in the drawing, a spray pattern (34) of about 45 degrees downward ends about the junction (36) where the bottom cone section (31) begins. At the end of the conical spray area (34) the liquid has already evaporated off and the solid particles are collected at the bottom section (31) and removed through outlet (33). The downward motion supplied to the solid, non-volatile matter by the vertical component of the angled spray from the pressurized nozzle will force the non-volatile matter downward within the evacuated, heated chamber to settle as a semi-dry to dry solid powder to be removed through the particle outlet (33). Supplied heating to the conical section of apparatus (20) aids in the creation of dry solids at particle outlet (33).

Suspended or colloidal particulates which are commonly found in the solutions or suspensions used in the apparatus comprise about 0 to 60% and have a particle size of from about 0.001 microns to 200 microns.

The nozzle used in the apparatus is a type having variable flow rate capabilities so it can more easily and controllably raise and lower liquid slurry or feed material flow rate into the chamber (22) using a spray pattern that will not interfere or overlap the spray pattern if another nozzle system is used. A suitable type of nozzle head is available from Delavan Spray Technologies, Inc. and its SDX type nozzle heads which produce a hollow cone spray pattern and wherein special adaptors are available to provide multiple nozzle installations. Most preferably the spray nozzle is an atomizing or nebulizing spray nozzle that produces high surface area microdroplets of feed material.

The apparatus may be provided with controls which are associated with the temperature, flow rate, level, motor, valve, pump and pressure monitors or sensors used with the apparatus so as to provide self-correcting actions including adjusting the flow rate from the nozzle.

The following examples are merely illustrative of the present invention.

EXAMPLE 1

Conversion of Tag Water to Purified Water

Feed tap water is pressurized to 100 psi and heated to 60°-120° C. and injected into the chamber of the apparatus of FIG. 2 through a hollow cone nozzle at the rate of 1-10 GPM so as to provide a spray pattern of 45-90°. The chamber is at a vacuum range between 10 mm Hg absolute and 80 mm Hg absolute with a temperature of between 80-120° C. so as to flash convert the water to steam. Any non-volatile matter falls out to the chamber bottom (31) and the steam is removed to a condenser having a temperature between about −15° C. and 10° C. to condense the steam to produce purified water.

The use of a demister was not required.

EXAMPLE 2

A composition containing dipropylene glycol with 6% water and 20% by weight of suspended solid particles having a slurry density of about 10.1 lbs/gal was preheated to 220° C. and injected under a pressure of about 150 psi into the heated vacuum chamber of the apparatus of FIG. 2 which was preheated to 240° C. The slurry was injected through a 90 degree hollow cone-nozzle at the rate of 1 gal/min. The chamber operational vacuum range was between 10 to 30 mm Hg absolute. The operating temperature range of the condenser was 30 to 35° C. which was sufficient to condense the dipropylene glycol but not the water. The dipropylene glycol was collected and the water, which remained a gas, was removed by the vacuum pumping system and discharged.

RESULTS 0.87 gal/min. of dipropylene glycol was collected.

2.0 lbs/min. of solid particulates were collected.

The water could have been collected if a further condenser had been used to convert the water vapor to liquid.

What is claimed is:

1. A flash evaporation apparatus for separating components of liquid-liquid or liquid-solids compositions which comprises:
   an evaporator vessel having an inner chamber with a vertical axis and a particle collection portion at the bottom;
   feeding means for delivering feed liquid compositions to be separated under elevated temperature and pressure to an atomizing spray nozzle;
   at least one atomizing spray nozzle located within and at the top part of said evaporator vessel; said at least one atomizing spray nozzle providing a downward spray cone angle of about 30 to 150 degrees;
   means for providing heat within the inner chamber of said evaporator vessel;
   means for heating the walls of said evaporator vessel;
   at least one condenser operatively connected with the upper portion of said evaporator vessel to collect evaporated liquid;
   vacuum means operatively connected with said at least one condenser for maintaining a vacuum in said at least one condenser and said evaporator vessel;
   at least one separate liquid collecting means connected to said at least one condenser; and means for measuring the temperature within said evaporator vessel collected at the bottom of said evaporator vessel.

2. The apparatus of claim 1 including a particle separator connected between said evaporator vessel and said at least one condenser.

3. The apparatus of claim 1 wherein the bottom portion of said evaporator apparatus is cone shaped or disk shaped.

4. The apparatus of claim 1 wherein said evaporator vessel has an outer jacket having circulating fluid.

5. The apparatus of claim 4 wherein said fluid is oil.

6. The apparatus of claim 1 including an infra-red heating element to maintain temperature variation at substantially zero at the top part of said evaporator vessel and about said atomizing spray nozzle, and outside of the spray cone.

7. The apparatus of claim 1 including means for measuring the temperature within said evaporator vessel.

8. The apparatus of claim 1 including means for recycling any heat collected from condensing vapors at said at least one condenser to said feeding means.

9. The apparatus of claim 1 wherein said atomizing spray nozzle has variable flow rate capabilities.

10. A method for the separation of components of liquid-liquid or liquid-solids compositions which comprise:

preheating and injecting under pressure into an evaporation chamber through an atomizing spray nozzle said liquid-liquid or liquid-solids composition; said composition being sprayed downwardly at a spray cone angle from about 30 to 150 degrees;

applying a partial pressure of from about 0.1 mm Hg absolute to 760 mm Hg absolute and a temperature range from about 10° C. to 450° C. to said chamber;

removing any vapors formed by heating and/or vacuum from the top part of said evaporation chamber;

condensing the vapors removed from the evaporation chamber, and collecting any solids from the bottom of said evaporation chamber , wherein said evaporation of pre-heated atomized liquid droplets occurs within the free space of said evaporation chamber without contact with any heated surface.

11. The method of claim 10 including recovery of any condensed liquid.

12. The method of claim 10 wherein the vapors are drawn by vacuum or pressure difference into at least one condenser.

13. The method of claim 10 which comprises heating said evaporation chamber by radiant heat.

14. The method of claim 10 wherein said liquid-liquid composition comprises liquids of different boiling points.

15. The method of claim 10 wherein the vapors are demisted prior to condensation.

16. The method of claim 10 wherein the temperature variation throughout said evaporation chamber is substantially zero.

* * * * *